United States Patent
Hacker et al.

(10) Patent No.: US 9,267,038 B2
(45) Date of Patent: Feb. 23, 2016

(54) ASPHALT BINDER COMPOSITIONS AND METHODS TO MAKE AND USE SAME

(71) Applicant: Honeywell International Inc., Morristown, NJ (US)

(72) Inventors: Scott Martin Hacker, River Edge, NJ (US); Yonghong Ruan, Wayne, NJ (US); Paul Chi Lem, Randolph, NJ (US)

(73) Assignee: Honeywell International Inc., Morris Plains, NJ (US)

(*) Notice: Subject to any disclaimer, the term of this patent is extended or adjusted under 35 U.S.C. 154(b) by 0 days.

(21) Appl. No.: 14/562,387

(22) Filed: Dec. 5, 2014

(65) Prior Publication Data

US 2015/0191597 A1 Jul. 9, 2015

Related U.S. Application Data

(60) Provisional application No. 61/924,582, filed on Jan. 7, 2014.

(51) Int. Cl.

| | |
|---|---|
| *C08L 95/00* | (2006.01) |
| *C08L 23/02* | (2006.01) |
| *C08L 23/26* | (2006.01) |
| *C04B 26/26* | (2006.01) |
| *C08J 3/00* | (2006.01) |
| *C08J 3/20* | (2006.01) |
| *C08L 23/06* | (2006.01) |
| *C08L 23/30* | (2006.01) |
| *E01C 7/18* | (2006.01) |
| *E04D 1/00* | (2006.01) |

(52) U.S. Cl.
CPC ............... *C08L 95/00* (2013.01); *C08J 3/005* (2013.01); *C08J 3/203* (2013.01); *C08L 23/06* (2013.01); *C08L 23/30* (2013.01); *E01C 7/18* (2013.01); *E04D 1/00* (2013.01); *C08J 2323/26* (2013.01); *C08J 2323/30* (2013.01); *C08J 2423/26* (2013.01); *C08J 2423/30* (2013.01); *C08L 2205/025* (2013.01); *C08L 2207/062* (2013.01); *C08L 2555/22* (2013.01); *C08L 2555/80* (2013.01); *C08L 2555/86* (2013.01)

(58) Field of Classification Search
CPC .................................. C08J 3/005; C08J 3/203
USPC .......................................................... 524/68
See application file for complete search history.

(56) References Cited

U.S. PATENT DOCUMENTS

| | | | |
|---|---|---|---|
| 6,011,095 A | 1/2000 | Planche et al. | |
| 6,384,112 B1 | 5/2002 | Boussad | |
| 6,759,453 B2 | 7/2004 | Jelling et al. | |
| 6,913,712 B2 | 7/2005 | Hayoz | |
| 7,838,575 B2 | 11/2010 | Lang et al. | |
| 8,252,216 B2 | 8/2012 | Abramson et al. | |
| 8,298,662 B2 | 10/2012 | Samanta et al. | |
| 2002/0042477 A1 | 4/2002 | Jelling et al. | |
| 2005/0101702 A1* | 5/2005 | Stuart, Jr. ................ | C08L 95/00 524/59 |
| 2012/0196959 A1 | 8/2012 | Rotz et al. | |
| 2012/0225979 A1 | 9/2012 | Naidoo et al. | |
| 2014/0069297 A1 | 3/2014 | Rotz et al. | |

FOREIGN PATENT DOCUMENTS

| | | |
|---|---|---|
| AU | 669336 C | 3/1997 |
| CN | 101186133 B | 6/2010 |
| CN | 101955335 B | 1/2013 |
| CN | 102942793 A | 2/2013 |
| EP | 548412 A1 | 6/1993 |
| EP | 2275482 B1 | 10/2011 |
| JP | 04350963 B2 | 10/2009 |
| JP | 04639602 B2 | 2/2011 |
| WO | 2000023522 A1 | 4/2000 |
| WO | 2004096916 A1 | 11/2004 |

OTHER PUBLICATIONS

Perez-Lepe et al., Influence of Polymer Concentration on the Microstructure and Rheological Properties of High-Density Polyethlene (HDPE)-modified bitumen, Energy and Fuels, v 19, n 3, p. 1148-1152, May/Jun. 2005; ISSN: 08870624.
Santamaria et al., Rheological Techniques as a Tool to Analyze Polymer-Bitumen Interactions: Bitumen Modified with Polyethylene and Polyethylene-Based Blends, Energy and Fuels, v 16, n 5, p. 1256-1263, Sep./Oct. 2002; ISSN: Publisher: American Chemical Society (ACS).
Fawcett et al., An Attempt at Engineering the Bulk Properties of Blends of a Bitumen with Polymers, Advances in Polymer Technology, v 21, n 4, p. 275-286, Winter 2002; ISSN: 07306679; DOI: 10.1002/adv.10032; Publisher: John Wiley and Sons Inc.
Kellomaeki et al., Dispersion of Polyolefins in Bitumen by Means of Tall Oil Pitch, and Microscopic Characterization of Mixes, Fuel, v 75, n 7, 896-898 (May 1996), ISSN: 00162361; Publisher: Elsevier.
Yeh, A Study of the Potential use of Asphalt Containing Synthetic Polymers for Asphalt Paving Mixes, Louisiana State University and Agricultural and Mechanical College, Dissertation, 2000; ISBN-10: 049307175X.

\* cited by examiner

*Primary Examiner* — Kelechi Egwim
(74) *Attorney, Agent, or Firm* — Ingrassia Fisher & Lorenz PC

(57) ABSTRACT

Asphalt binder compositions are provided comprising asphalt and a polymer blend, wherein the polymer blend comprises oxidized high density polyethylene and another polymer chosen from: maleated polypropylene, polyethylene homopolymer, high crystallinity polyethylene, and combinations thereof. Also provided are paving and roofing materials comprising the aforesaid asphalt binder compositions and an aggregate material. Methods for making and using the asphalt binder compositions are also provided.

20 Claims, No Drawings

ASPHALT BINDER COMPOSITIONS AND METHODS TO MAKE AND USE SAME

CROSS-REFERENCE TO RELATED APPLICATIONS

This application claims the benefit of U.S. Provisional Application No. 61/924,582, filed Jan. 7, 2014, pursuant to 35 USC 119(e)).

FIELD

The present disclosure generally relates to asphalt binder compositions and methods of making and using the same. More particularly, the asphalt binder compositions comprising bitumen and a polymer blend comprising specified polyolefins are provided, along with methods of making and using such asphalt binder compositions.

BACKGROUND

Asphalt mixes are commonly used as paving materials for road construction and maintenance. Typically, asphalt, often referred to as asphalt binder, asphalt cement or bitumen, is mixed with aggregate to form material used in asphalt paving. Processing and use of this material yields asphalt pavement. More particularly, asphalt pavement comprises aggregate held within a continuous phase of the asphalt binder by adherence of the asphalt binder to the aggregate.

The strength and durability of the asphalt pavement depends on various factors such as the properties of the materials used, the interaction of the various materials, the mix design, construction practices and environmental and traffic conditions to which the pavement is exposed. To produce a mix that will have good performance during the lifetime of the pavement, it is important to attain proper coating of the aggregate with the asphalt and good adhesion between both components, as well as good overall cohesive strength of the asphalt.

Conventional asphalt materials suffer from various types of distress modes due to exposure to environmental conditions, such as, for example, permanent deformation, creep and rutting at high temperatures and brittleness and cracking at low temperatures. To improve resistance of asphalt materials to these various distress modes, high temperature performance additives, e.g., plastomers and/or elastomers, and/or low temperature performance additives, e.g., process oils, are incorporated into the asphalt materials. The high temperature performance additives tend to increase the modulus of the asphalt material at higher temperatures to resist permanent deformation and creep while the low temperature performance additives tend to increase flexibility and ductility of the asphalt material at lower temperatures to resist brittleness and cracking.

Unfortunately, current low temperature performance additives are not always as effective as desired at increasing the flexibility and ductility of the asphalt material at lower temperatures, and often detract from the high temperature performance properties of the asphalt material even with the addition of high temperature performance additives. On the other hand, current high temperature performance additives are not always as effective as desired at reducing permanent deformation, creep and rutting at high temperatures, and often detract from the low temperature performance properties of the asphalt material even with the addition of low temperature performance additives. Typical polymers used to modify asphalt binders to reduce or prevent rutting include elastomers, such as, for example, styrene/butadiene/styrene copolymer (SBS), and plastomers, such as, for example, polyethylene, ethyl/vinyl acetate copolymer (EVA), and the like.

The asphalt Performance Grade (PG) rating system categorizes asphalt binders used in asphalt pavement based on the binder's performance at different temperatures. An asphalt binder having a PG rating of about 64-22, for example, means that the asphalt binder can be used in a climate where the pavement reaches temperatures as high as +64° C. and as low as −22° C. Temperatures outside the PG range of the asphalt binder usually lead to deterioration of the asphalt pavement in which this binder is used. Hence, it has for some time been an objective to broaden the PG range of asphalt binders used in road pavement applications.

The Useful Temperature Interval (UTI) of an asphalt is the difference between the high and low temperature PG grading. Generally, to obtain a UTI of >92° C., a modified asphalt is needed. For example, PG 76-22, a common polymer modified asphalt, has a UTI of 98° C. In addition to increasing the PG range of the asphalt binder, modifiers also improve other qualities of the resulting asphalt, such as its general toughness and wear characteristics.

There remains a need for new asphalt binder modifiers that broaden the PG range and increase the useful temperature interval of asphalt binders. Other desirable features and characteristics of the asphalt binder compositions and methods of making and using same that are described herein will become apparent from the following detailed description and the appended claims.

SUMMARY

The present disclosure provides asphalt binder compositions as well as methods of making and using them. In an exemplary embodiment, the asphalt binder composition comprises a) asphalt and b) a polymer blend, wherein the polymer blend comprises (i) oxidized high density polyethylene, and (ii) a modifying polymer chosen from: maleated polypropylene, polyethylene homopolymer. high crystallinity polyethylene, or combinations thereof.

In another embodiment, the asphalt binder composition consists essentially of a) asphalt and b) a polymer blend, wherein the polymer blend comprises (i) oxidized high density polyethylene, and (ii) a modifying polymer chosen from: maleated polypropylene, polyethylene homopolymer, high crystallinity polyethylene, or combinations thereof.

In another exemplary embodiment, a method for making an asphalt binder composition is provided. This method comprises mixing asphalt, oxidized high density polyethylene and a modifying polymer chosen from maleated polypropylene, polyethylene homopolymer, high crystallinity polyethylene, or combinations thereof to form the asphalt binder composition.

DETAILED DESCRIPTION

Novel asphalt binder compositions and methods of making and using the same are provided and described herein. It has surprisingly been found that the addition of certain blends of polymers to asphalt binder compositions broadens the PG range and increases the UTI of the asphalt binder compositions. The effect of these polymer blends on the PG range and UTI of the asphalt binder compositions is synergistic. In other words, at the same total polymer dosage level, polymer blends have better performance than each individual polymer at the same dosage level. Better performance can translate into longer road life or longer building life, and that will bring significant economic benefits to customers. Another benefit of the asphalt binder compositions contemplated and described herein is that the same level of performance with respect to the PG range and UTI may be achieved with significantly reduced polymer quantity, which translates in significant cost reductions.

In an exemplary embodiment, an asphalt binder composition comprises asphalt and a polymer blend, wherein the polymer blend comprises: (i) oxidized high density polyethylene and (ii) a modifying polymer chosen from: maleated polypropylene, polyethylene homopolymer, high crystallinity polyethylene, or combinations thereof. In some embodiments, the polymer blend comprises (i) oxidized high density polyethylene and (ii) maleated polypropylene. In other embodiments, the polymer blend comprises (i) oxidized high density polyethylene and (ii) polyethylene homopolymer. In still other embodiments, the polymer blend comprises (i) oxidized high density polyethylene and (ii) high crystallinity polyethylene.

Asphalt is defined by the ASTM as a dark brown to black cement-like material in which the predominant constituents are bitumens that occur in nature or are obtained in petroleum processing. Asphalts characteristically contain saturates, aromatics, resins and asphaltenes. The terms "asphalt" and "bitumen" are often used interchangeably to mean both natural and manufactured forms of the material, which are all within the scope of the compositions and methods contemplated and described herein. Hereinafter, only the term "asphalt" will be used to describe suitable asphalt and bitumen materials.

The type of asphalt suitable for use in the compositions and methods contemplated and described herein are not particularly limited and include any naturally occurring, synthetically manufactured and modified asphalts known now or in the future. Naturally occurring asphalt is inclusive of native rock asphalt, lake asphalt, and the like. Synthetically manufactured asphalt is often a byproduct of petroleum refining operations and includes air-blown asphalt, blended asphalt, cracked or residual asphalt, petroleum asphalt, propane asphalt, straight-run asphalt, thermal asphalt, and the like. Modified asphalt includes base asphalt (e.g., neat or unmodified asphalt that can be naturally occurring or synthetically manufactured) modified with elastomers, phosphoric acid, polyphosphoric acid, plastomers, ground tire rubber (GTR), reclaimed asphalt pavement (RAP), reclaimed asphalt single (RAS), and the like, or various combinations of these modifiers.

Furthermore, industry-grade asphalts, including without limitation, paving-grade asphalts, are advantageous for use in the compositions and methods contemplated and described herein. Non-exclusive examples of paving-grade asphalts include asphalts having any one of the following performance grade ratings: PG 46-34, PG 52-34, PG 52-28, PG 58-28, PG 64-22, PG 64-16, PG 64-10, PG 67-22, PG 70-28, PG 70-22, PG 70-16, PG 70-10, PG 76-28, PG 76-22, PG 76-16 and PG 76-10. Additionally, non-exclusive examples of paving-grade asphalts within the scope of the present invention include paving-grade asphalts having any one of the following penetration grades: 50/70, 60/90, 80/100, 80/120, and 120/150.

Additionally, it is contemplated that industry-grade asphalts, such as roof-grade asphalts, may be advantageously used in the asphalt binder compositions contemplated and described herein. In such embodiments, the asphalt binder compositions will be useful for roofing applications. Suitable roofing-grade asphalts include, for example, but not limited to, asphalts having any one of the following hardness grades: 100/150 dmm pen, 150/200 dmm pen, 200/300 dmm pen, and 300+dmm pen, such as, but not limited to PG 58-28, 64-22, 67-22, 70-22, and 76-22. In some embodiments of the asphalt binder composition, the asphalt is present at a concentration of from about 65 to about 99 weight % (wt %), based on the total weight of the asphalt binder composition. For example, the asphalt may be present at a concentration of from about 70 to 90 wt %, or from about 65 to about 75 wt %, or from about 75 to about 99 wt %, or from about 75 to about 95 wt %, or from about 75 to about 85 wt %, or even from about 85 to about 99 wt %, based on the total weight of the asphalt binder composition. In some exemplary embodiments, the asphalt is present at a concentration of from about 94 to about 99 wt %, such as about 96.5 wt %, based on the total weight of the asphalt binder composition.

In some embodiments, the polymer blend is present at a concentration of from about 0.5 to about 25 wt %, based on the total weight of the asphalt binder composition. For example, without limitation, the polymer blend is present at a concentration of from about 0.5 to about 5 wt %, or from about 0.5 to about 10 wt %, or from about 3 to about 8 wt %, or from about 5 to about 10 wt %, or from about 5 to about 15 wt %, or from about 10 to about 15 wt %, or from about 10 to about 20 wt %, or from about 15 to about 20 wt %, or from about 15 to about 25 wt %, or even from about 20 to about 25 wt %, based on the total weight of the asphalt binder composition. In some embodiments, the polymer blend is present at a concentration of from about 1 to about 5 wt %, for example, about 3.5 wt %, based on the total weight of the asphalt binder composition. The suitable and desired concentration of polymer blend in any embodiment of the asphalt binder composition will be determined and selected by experimentation according to the final properties required for the particular end-use intended, e.g., PG or roofing grade asphalt tests.

In some embodiments of the asphalt binder composition contemplated and described herein, the polymer blend comprises (i) oxidized high density polyethylene and (ii) a modifying polymer chosen from: maleated polypropylene, polyethylene homopolymer, high crystallinity polyethylene, or combinations thereof, at a weight ratio of (oxidized high density polyethylene):(modifying polymer) of from about 1:4 to about 4:1. For example, without limitation, the oxidized high density polyethylene and the modifying polymer may be present in a weight ratio of from about 1:3 to about 3:1, or from about 1:2 to about 2:1, or from about 1:2 to about 1:3, or from about 1:4 to about 3:1, or from about 1:4 to about 2:1, or from about 1:3 to about 4:1, or from about 2:3 to about 4:1, or from about 2:3 to about 3:1, for from about 2:3 to about 3:2, or from about 3:1 to 4:1, or from about 3:1 to about 2:1, respectively, or even about 1:1. Suitable weight ratios for the oxidized high density polyethylene and the modifying polymer, in the polymer blend, in any embodiment of the asphalt binder composition will be determined and selected by experimentation according to the final properties required for the particular end-use intended, e.g., PG or roofing grade asphalt tests.

In some embodiments of the asphalt binder composition, each of the oxidized high density polyethylene, maleated polypropylene, polyethylene homopolymer and high crystallinity polyethylene, independently, has a weight average molecular weight (Mw) of from about 800 to about 50,000 g/mol. For example, the Mw of each of the aforesaid polymers may be from about 1000 to about 5000 g/mol, or from about 5000 to about 10,000 g/mol, or from about 10,000 to about 20,000 g/mol, or from about 20,000 to about 30,000 g/mol, or from about 30,000 to about 40,000 g/mol, or even from about 40,000 to about 50,000 g/mol. In one embodiment, for example, each of these polymers may have a molecular weight of from about 2000 to about 15,000 g/mol, such as from about 4000 to about 20,000 g/mol. The weight average molecular weight is determined by gel permeation chromatography (GPC), which is a technique generally known in the art. More particularly, according to the GPC method used, the sample to be measured is dissolved in 1,2, 4-trichlorobenzene at 140° C. at a concentration of 2.0 mg/ml. The solution (200 uL) is injected into the GPC containing two PL gel 5 μm Mixed-D (300×7.5 mm) columns held at 140° C.

with a flow rate of 1.0 mL/minute. The instrument is equipped with two detectors (refractive index and viscosity detector). The molecular weight (weight average molecular weight, Mw) is determined using a calibration curve generated from a set of linear polyethylene narrow Mw standards.

Furthermore, in some embodiments, the oxidized high density polyethylene, maleated polypropylene, polyethylene homopolymer and high crystallinity polyethylene suitable for use in the asphalt binder composition each have a crystallinity of greater than 50%, based on the total weight of the polymer being described. For example, without limitation, the aforesaid polymers may each have a crystallinity of greater than about 75%, or from about 50 to about 60%, or from about 60 to about 70%, or from about 70 to about 80%, or from about 80 to about 90%, or even from about 90 to about 100%, based on the total weight of the polymer being described. Furthermore, in some embodiments in which polyethylene homopolymer is used, the polyethylene homopolymer may have a crystallinity of greater than 80%. Whereas, in some other embodiments in which high crystallinity polyethylene is used, the high crystallinity polyethylene has a crystallinity of greater than 90%. The crystallinity of the aforesaid polymers is determined by Differential Scanning calorimetry (DSC), which is a technique generally known in the art. The DSC is run in a heat, cool, re-heat cycle at 10° C./minute heating and cooling rates. More particularly, the sample is initially cooled to −50° C. then heated to 150° C., cooled back down to −50° C. and reheated to 150° C.

Within the aforesaid weight average molecular weight and crystallinity ranges discussed above, the types and methods of manufacture of the various polymers (i,e, oxidized high density polyethylene, maleated polypropylene, polyethylene homopolymer and high crystallinity polyethylene) is not particularly limited. For instance, suitable polymers in accordance with those described herein are commercially available from Honeywell International, N.J., USA, under the tradenames HONEYWELL TITAN 7686 (oxidized high density polyethylene), HONEYWELL TITAN 7278 (maleated polypropylene), HONEYWELL TITAN 7212 (polyethylene homopolymer) and HONEYWELL TITAN™ 7387 (high crystallinity polyethylene).

In some embodiments, the asphalt binder composition contemplated herein has a broadened PG range and may also have a useful temperature interval (UTI) of at least about 90° C. For example, without limitation, the UTI of the asphalt binder composition may be at least about 92° C., or at least 93° C., or at least 94° C., or at least 95° C., or at least about 96° C., or at least about 97° C., or even at least about 98° C.

In another exemplary embodiment, the asphalt binder composition comprises asphalt and a polymer blend, wherein the polymer blend comprises at least two polymers chosen from: maleated polypropylene, polyethylene homopolymer and high crystallinity polyethylene, in the absence of oxidized high density polyethylene. Furthermore, in some embodiments of this exemplary embodiment, the asphalt binder composition comprises asphalt and a polymer blend, wherein the polymer blend consists essentially of at least two polymers chosen from: maleated polypropylene, polyethylene homopolymer and high crystallinity polyethylene, in the absence of oxidized high density polyethylene.

Additionally, the asphalt binder composition may further comprise one or more additional additives such as are familiar to persons of ordinary skill in the relevant art now and in the future. Such additives are typically used to improve certain properties of the asphalt binder composition and products to be made therefrom (e.g., penetration (i.e., hardness), viscosity, and softening point, to name a few). Non-exclusive examples of such additives suitable for inclusion in the asphalt binder compositions contemplated and described herein include, without limitation, plastomers, elastomers, waxes, polyphosphoric acids, flux oils, plasticizers, anti-oxidants, and combinations thereof, among others, such as, for example, recycled ground tire rubber, crumb rubber or polyoctenamer, and anti-strip additives, non-limiting examples of which are hydrated lime and amines.

In some embodiments of the asphalt binder composition, the one or more additional additives together are present at a total concentration of from about 0.5 to about 20 wt %, based on the total weight of the asphalt binder composition. For example, the total concentration of such additional additives in the asphalt binder composition may be from about 0.5 to about 1.0 wt %, or from about 1.0 to about 5.0 wt %, or from about 5.0 to about 10 wt %, or even from about 10 to about 20 w %, based on the total weight of the asphalt binder composition. More particularly, in some embodiments the asphalt binder composition may comprise a total concentration of such additional additives of from about 1 to about 2 wt %, such as about 1 wt %, based on the total weight of the asphalt binder composition.

Suitable elastomers may, for example, be selected from the group consisting of natural rubber and synthetic polymerized rubber. Other non-exclusive examples of suitable elastomers or plastomers include butyl, polybutadiene, polyisoprene and polyisobutene rubber; styrene/butadiene copolymer such as styrene/butadiene/styrene triblock copolymer (SBS); styrene/ethylene-butylene/styrene triblock copolymer (SEBS); poly(styrene-isoprene-styrene) (SIS); ethylene-methacrylate (EMA); ethylene-propylene diene monomer (EPDM); ethylene-vinyl-acetate (EVA); and ethylene-butyl acrylate-glycidyl methacrylate terpolymer.

Waxes suitable for use as an additional additive in the asphalt binder composition may be functionalized or synthetic waxes or naturally occurring waxes. Furthermore, the wax may be oxidized or non-oxidized. Non-exclusive examples of synthetic waxes include ethylene bis-stearamide wax (EBS), Fischer-Tropsch wax (FT), oxidized Fischer-Tropsch wax (FTO), polyolefin waxes such as polyethylene wax (PE), oxidized polyethylene wax (OxPE), polypropylene wax, polypropylene/polyethylene wax, alcohol wax, silicone wax, petroleum waxes such as microcrystalline wax or paraffin, and other synthetic waxes. Non-exclusive examples of functionalized waxes include amine waxes, amide waxes, ester waxes, carboxylic acid waxes, and microcrystalline waxes. Naturally occurring wax may be derived from a plant, from an animal, or from a mineral, or from other sources known now or in the future. Non-exclusive examples of natural waxes include plant waxes such as candelilla wax, carnauba wax, rice wax, Japan wax and jojoba oil; animal waxes such as beeswax, lanolin and whale wax; and mineral waxes such as montan wax, ozokerite and ceresin. Mixtures of the aforesaid waxes are also suitable, such as, for example, the wax may include a blend of a Fischer-Tropsch (FT) wax and a polyethylene wax.

Phosphoric acid is another substance that may be used as an additional additive in some embodiments of the asphalt binder composition, in conventional amounts, for example, to raise the product's softening point. The phosphoric acid may be provided in any suitable form, including a mixture of different forms of phosphoric acid. For example, some suitable different forms of phosphoric acid include phosphoric acid, polyphosphoric acid, superphosphoric acid, pyrophosphoric acid and triphosphoric acid.

Plasticizers may also be used as additional additives, in conventional amounts, to increase the plasticity or fluidity of an asphalt binder composition in accordance with embodiments described herein. Non-exclusive examples of suitable plasticizers include hydrocarbon oils (e.g., paraffin, aromatic and naphthenic oils), long chain alkyl diesters (e.g., phthalic acid esters, such as dioctyl phthalate, and adipic acid esters, such as dioctyl adipate), sebacic acid esters, glycol, fatty acid, phosphoric and stearic esters, epoxy plasticizers (e.g., epoxidized soybean oil), polyether and polyester plasticizers, alkyl monoesters (e.g., butyl oleate), long chain partial ether esters (e.g., butyl cellosolve oleate), among others familiar to persons of ordinary skill in the art now or in the future.

Anti-oxidants may be used in conventional amounts as additional additives for the asphalt binder compositions to prevent the oxidative degradation of polymers that causes a loss of strength and flexibility in these materials.

Also provided are methods of making and using the asphalt binder compositions described hereinabove. Generally, the method for making asphalt binder compositions comprises mixing (i) oxidized high density polyethylene with (ii) another polymer chosen from maleated polypropylene, polyethylene homopolymer, high crystallinity polyethylene, or combinations thereof, and with asphalt, in appropriate amounts to form any of the embodiments of the asphalt binder composition described above. It is noted that in some embodiments, the method for making an asphalt binder composition may comprise first mixing (i) oxidized high density polyethylene with (ii) another polymer chosen from maleated polypropylene, polyethylene homopolymer, high crystallinity polyethylene, or combinations thereof, in appropriate amounts, to form a suitable polymer blend as described above, and then mixing the polymer blend with asphalt, in appropriate amounts to form an asphalt binder composition in accordance with the above description. "Appropriate amounts" of the asphalt and the (i) oxidized high density polyethylene and the (ii) modifying polymer means that the oxidized high density polyethylene and the modifying polymer may be provided in amounts wherein the weight ratio is from about 3:1 to about 1:3, respectively, and the asphalt is present in the resulting asphalt binder composition at a concentration of from about 65 to about 99 wt %, based on the total weight of the asphalt binder composition.

The mixing is performed at suitable temperatures and agitation, and under overall conditions familiar now and in the future to persons having ordinary skill in the art. In some embodiments of the method, for example, the mixing is performed at a temperature of from about 75° C. to about 200° C. for a time of from about 30 minutes to about 6 hours. Furthermore, the mixing may be performed, for example, using a low shear mixer at a speed of from about 5 revolutions per minute (RPM) to about 100 RPM.

Methods of broadening the PG range, or increasing the useful temperature interval (UTI), of an asphalt binder composition in accordance with those described hereinabove are also contemplated. Both such methods comprise mixing (i) oxidized high density polyethylene with (ii) another polymer chosen from maleated polypropylene, polyethylene homopolymer, high crystallinity polyethylene, or combinations thereof, and with asphalt, in appropriate amounts to form any of the embodiments of the asphalt binder composition described above. For example, without limitation, the oxidized high density polyethylene and the modifying polymer may be provided in amounts wherein the weight ratio is from about 3:1 to about 1:3, respectively, and the asphalt is present in the resulting asphalt binder composition at a concentration of from about 65 to about 99 wt %, based on the total weight of the asphalt binder composition.

In other exemplary embodiments, methods are provided for using the asphalt binder compositions described herein. In one embodiment, for example, a method involves preparing paving material by mixing the asphalt binder composition with aggregate. "Aggregate" is a collective term for mineral materials, such as, for example, sand, gravel, or crushed stone. The aggregate may comprise natural aggregate, manufactured aggregate, or a combination thereof. Natural aggregate is typically extracted rock from an open excavation (e.g. a quarry) that is reduced to usable sizes by mechanical crushing. Manufactured aggregate is typically a byproduct of other manufacturing processes such as slag from metallurgical processing (e.g. steel, tin, and copper production). Manufactured aggregate also includes specialty materials that are produced to have a particular physical characteristic not found in natural rock.

Such methods may further comprise using the paving material for road construction, road maintenance, or both. The paving material and roads obtained by such methods will have longer useful lives, with less required maintenance due to the minimization of distress modes such as permanent deformation, creep and rutting at high temperatures and brittleness and cracking at low temperatures. In another embodiment, the method involves preparing roofing material by mixing the asphalt binder composition with aggregate. Such methods may further comprise using the roofing material for roof construction, roof maintenance, or both. The roofing material and roofs obtained by such methods will have longer useful lives, with less required maintenance due to the minimization of distress modes such as scuffing, sliding at high temperatures and brittleness and cracking at low temperatures.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the compositions and methods described herein in any way. Rather, the foregoing detailed description will provide those skilled in the art with a convenient road map for implementing an exemplary embodiment of the compositions and methods. It being understood that various changes may be made in the function and arrangement of elements described in an exemplary embodiment without departing from the scope of the compositions and methods as set forth in the appended claims.

EXAMPLES

Paving-type asphalt binder compositions comprising asphalt and various polymer blends, as specified below, were prepared and subjected to experimental steps to determine their performance grades:

The Mw of each of the polymers used in the following examples are as follows:

TITAN 7686 (ox.HDPE): Mw=8800 g/mol; 77% crystallinity

TITAN 7278 (MAPP): Mw=8560 g/mol; 56% crystallinity

TITAN 7212 (PE homo.): Mw=2950 g/mol; 84% crystallinity

TITAN 7387 (PE homo): Mw=2575 g/mol; 100% crystallinity

The general procedure used to formulate the sample asphalt binder compositions was as follows: (1) Asphalt (PG 64-22) was melted in a pint can in a hot oven set at 140° C.; (2) the asphalt can was transferred from the hot oven to a heating mantle; (3) the heating mantle was set at a temperature of 190° C.; (4) a low shear mixer was lowered into the asphalt sample; (5) the low shear mixer was turned on and set at a mixing speed to 250 rpm; (6) the asphalt sample reached a temperature of 190° C.; (7) polymeric additive was slowly added into the asphalt sample within a 2-min period; (8) the asphalt sample was mixed for 1 hr; (9) the low shear mixer was stopped and removed from the asphalt sample; (10) the pint can was carefully taken out of the heating mantle; (11) the test specimens from the pint can were prepared and tested according to AASHTO M320. The results of the tests conducted are summarized in Table 1 below.

| Composition | Control | Blend 1 | Blend 2 | Blend 3 | Blend 4 |
|---|---|---|---|---|---|
| 64-22 D | 100.00% | 96.50% | 96.50% | 96.50% | 97.55% |
| Honeywell Titan ® 7686 (ox. HDPE) | | 3.50% | | 2.10% | 1.47% |
| Honeywell Titan ® 7278 (MAPP) | | | 3.50% | 1.40% | 0.98% |
| Total | 1.00 | 1.00 | 1.00 | 1.00 | 1.00 |
| Total Polymer Loading | 0.00% | 3.50% | 3.50% | 3.50% | 2.45% |
| Actual PG Grade | 66.9-24.9 | 76.6-22.7 | 72.1-23.3 | 81.4-23.1 | 76.2-23.4 |
| Useful Temperature Interval (UTI) | 91.8 | 99.3 | 95.4 | 104.5 | 99.6 |
| PG Grade | 64-22 | 76-22 | 70-22 | 76-22 | 76-22 |

The data in Table 1 show that blends of oxidized high density polyethylene and maleated polypropylene broaden the PG range (UTI) of the asphalt binder to a higher degree than equal amounts of oxidized high density polyethylene and maleated polypropylene alone (compare blends 1, 2 and 3). These data also show that smaller total amounts of polymer blends can broaden the PG range of the asphalt binder to the same degree as larger amounts of the individual polymers (compare blends 1 and 4).

Similar tests were also conducted to determine optimal blending ratios. The results of these tests are summarized in Table 2 below.

TABLE 2

| | temp. (° C.) | Control | Blend 1 | Blend 2 | Blend 3 | Blend 4 | Blend 5 | Blend 6 |
|---|---|---|---|---|---|---|---|---|
| Composition | | | | | | | | |
| 64-22 D (asphalt) | | 100.00% | 97.55% | 97.55% | 97.55% | 97.55% | 97.55% | 97.55% |
| Honeywell Titan ® 7686 (ox. HDPE) | | | 2.45% | 1.96% | 1.47% | 0.98% | 0.49% | |
| Honeywell Titan ® 7278 (MAPP) | | | | 0.49% | 0.98% | 1.47% | 1.96% | 2.45% |
| Total | | 1.00 | 1.00 | 1.00 | 1.00 | 1.00 | 1.00 | 1.00 |
| Total Polymer Loading | | 0.00% | 2.45% | 2.45% | 2.45% | 2.45% | 2.45% | 2.45% |
| Ratio 7686:7278 | | NA | 5:0 | 4:1 | 3:2 | 2:3 | 1:4 | 0:5 |
| 7278/(7686 + 7278) | | NA | 0 | 0.2 | 0.4 | 0.6 | 0.8 | 1 |
| MSCR on RTFO Residue | | | | | | | | |
| $J_{nr,\ 3.2\ kPa}$ (kPa$^{-1}$) | 64 | NA | 1.28 | 1.14 | 1.07 | 1.39 | 1.39 | 2.41 |
| $J_{nr,\ 3.2\ kPa}$ (kPa$^{-1}$) | 76 | NA | 6.67 | 5.75 | 5.27 | 6.81 | 6.40 | 9.06 |
| Actual PG Grade | | 66.9-24.9 | 66.9-24.9 | 73.9-23.3 | 75-23.3 | 76.2-23.4 | 74-23.6 | 73.4-23.6 | 69.4-23.4 |
| Useful Temperature Interval (UTI) | | 91.8 | 91.8 | 97.2 | 98.3 | 99.6 | 97.6 | 97.0 | 92.8 |
| PG Grade | | 64-22 | 64-22 | 70-22 | 70-22 | 76-22 | 70-22 | 70-22 | 64-22 |

The data in Table 2 show that a blending ratio of 3:2 with respect to a blend of oxidized high density polyethylene and maleated polypropylene is optimal (see blend 3).

Similar tests were also conducted to analyze blends of oxidized high density polyethylene and polyethylene homopolymer. The results of these tests are summarized in Table 3 below.

TABLE 3

| Composition | Blend 1 | Blend 2 | Blend 3 |
|---|---|---|---|
| 58-28 C (asphalt grade) | 98.50% | 99.00% | 98.50% |
| Honeywell Titan ® 7278 (MAPP) | | 0.50% | |
| Honeywell Titan ® 7212 (PE hom.) | | 0.50% | |
| Honeywell Titan ® 7686 (ox. HDPE) | 1.50% | 0.50% | 1.00% |
| Total | 1.00 | 1.00 | 1.00 |
| Actual PG Grade | 64-29.6 | 65.3-28.3 | 65.6-28.7 |
| Useful Temperature Interval (UTI) | 93.6 | 93.6 | 94.3 |
| PG Grade | 64-28 | 64-28 | 64-28 |

The data in Table 3 show that that smaller total amounts of polymer blends can broaden the PG range of the asphalt binder to the same degree as larger amounts of the individual polymers (compare blends 1 and 2).

The other polymer blends of the present invention are tested as the blends described above and give similar test results.

Roofing-type asphalt binder compositions comprising oxidized high density polyethylene (Ox. HDPE) or maleated polypropylene (MAPP), or blends of both types of polymers, were also tested (Table 4). These tests show that blends of oxidized high density polyethylene and maleated polypropylene have synergistic effects on asphalt hardness (PEN) and the asphalt's softening point. Penetration was determined using ASTM D5 and softening point determined using ASTM D36 testing protocols.

TABLE 4

|  | PEN (dmm @ 25° C.) | SP (° C.) | SP Increase (° C.) | |
|---|---|---|---|---|
| 64-22 A | 55.6 | 48.3 | NA | |
| 64-22 A; 5% Ox. HDPE | 36.6 | 90.65 | 42.35 | Blend 1 |
| 64-22 A; 5% MAPP | 27 | 61.45 | 13.15 | Blend 2 |
| 64-22 A; 3% Ox. HDPE & 2% MAPP | 26.8 | 116.15 | 67.85 | Blend 3 |
| 64-22 A; 2% Ox. HDPE & 3% MAPP | 25.8 | 114.4 | 66.10 | Blend 4 |
| 64-22 A; 4% Ox. HDPE & 1% MAPP | 28.8 | 113.95 | 65.65 | Blend 5 |
| 64-22 A; 1% Ox. HDPE & 4% MAPP | 28 | 105.1 | 56.8 | Blend 6 |

What is claimed is:

1. An asphalt binder composition comprising: a) asphalt and b) a polymer blend comprising (i) oxidized high density polyethylene, and (ii) a modifying polymer chosen from: maleated polypropylene, polyethylene homopolymer, high crystallinity polyethylene, or combinations thereof.

2. The asphalt binder composition of claim 1, wherein the oxidized high density polyethylene and the modifying polymer are present in a weight ratio of from about 1:4 to about 4:1, respectively.

3. The asphalt binder composition of claim 1, having a useful temperature interval (UTI) of at least about 90° C.

4. The asphalt binder composition of claim 1, wherein the polymer blend comprises (i) oxidized high density polyethylene and (ii) maleated polypropylene.

5. The asphalt binder composition of claim 4, wherein the oxidized high density polyethylene and the maleated polypropylene are present in a weight ratio) of from about 1:4 to about 4:1, respectively.

6. The asphalt binder composition of claim 1, wherein the polymer blend comprises (i) oxidized high density polyethylene and (ii) polyethylene homopolymer.

7. The asphalt binder composition of claim 6, wherein the oxidized high density polyethylene and the polyethylene homopolymer are present in a weight ratio of from about 1:4 to about 4:1, respectively.

8. The asphalt binder composition of claim 6, wherein the (ii) polyethylene homopolymer has a crystallinity of greater than about 80%.

9. The asphalt binder composition of claim 1, wherein the polymer blend comprises (i) oxidized high density polyethylene and (ii) high crystallinity polyethylene.

10. The asphalt binder composition of claim 9, wherein the oxidized high density polyethylene and the high crystallinity polyethylene are present in a weight ratio of from about 1:4 to about 4:1, respectively.

11. The asphalt binder composition of claim 9, wherein the (ii) high crystallinity polyethylene has a crystallinity of greater than about 90%.

12. The asphalt binder composition of claim 1, wherein the asphalt binder composition consists essentially of: a) asphalt and b) a polymer blend comprising (i) oxidized high density polyethylene, and (ii) a modifying polymer chosen from: maleated polypropylene, polyethylene homopolymer, high crystallinity polyethylene, or combinations thereof.

13. The asphalt binder composition of claim 12, wherein the oxidized high density polyethylene and the modifying polymer are present in a weight ratio of from about 1:4 to about 4:1, respectively.

14. The asphalt binder composition of claim 12, having a useful temperature interval (UTI) of at least about 90° C.

15. A paving or roofing material comprising:
aggregate; and
an asphalt binder composition comprising:
a) asphalt; and
b) a polymer blend comprising (i) oxidized high density polyethylene, and (ii) a modifying polymer chosen from: maleated polypropylene, polyethylene homopolymer. high crystallinity polyethylene, or combinations thereof.

16. The paving or roofing material of claim 15, wherein the oxidized high density polyethylene and the modifying polymer are present in a weight ratio of from about 1:4 to about 4:1, respectively, and wherein the asphalt binder composition has a useful temperature interval (UTI) of at least about 90° C.

17. A method for making an asphalt binder composition, said method comprising mixing asphalt, oxidized high density polyethylene and a modifying polymer chosen from maleated polypropylene, polyethylene homopolymer, high crystallinity polyethylene, or combinations thereof to form the asphalt binder composition.

18. The method of claim 17, wherein the mixing is performed at a temperature of from about 75° C. to about 200° C. and for a time of from about 30 minutes to about 6 hours.

19. The method of claim 17, wherein the asphalt binder composition comprises: from about 65 to about 99 weight % asphalt and from about 1 to about 35 weight % total oxidized high density polyethylene and modifying polymer, based on the total weight of the asphalt binder composition.

20. The method of claim 17, wherein the oxidized high density polyethylene and the modifying polymer are present in weight ratio of from about 1:4 to about 4:1, respectively.

* * * * *